United States Patent [19]

Finley

[11] 3,799,048

[45] Mar. 26, 1974

[54] DISPOSABLE COOKING UTENSIL WITH EVEN HEATING

[76] Inventor: Richard O. Finley, 2608 Graham Ave., Redondo Beach, Calif. 90278

[22] Filed: Apr. 10, 1972

[21] Appl. No.: 242,563

[52] U.S. Cl............................ 99/415, 99/425, 99/447
[51] Int. Cl........................ A47j 37/06, A47j 37/10
[58] Field of Search................ 99/425, 410–411, 99/412–413, 414–415, 416–417, 418, 426, 446–447, 448–449, 450; 126/39 M; 220/68, 76; 229/3.5 MF

[56] References Cited
UNITED STATES PATENTS

| | | | |
|---|---|---|---|
| 1,740,205 | 12/1929 | Schmidt | 99/415 UX |
| 2,042,993 | 6/1936 | Hopes | 99/447 UX |
| 2,085,220 | 6/1937 | Howlett | 99/425 UX |
| 2,216,984 | 10/1940 | Pearson | 99/426 UX |

FOREIGN PATENTS OR APPLICATIONS

| | | | |
|---|---|---|---|
| 45,560 | 5/1916 | Sweden | 99/447 |
| 824,727 | 12/1959 | Great Britain | 99/417 |

*Primary Examiner*—Peter Feldman
*Assistant Examiner*—Arthur O. Henderson
*Attorney, Agent, or Firm*—Harold E. Wurst

[57] ABSTRACT

A disposable cooking utensil, primarily for use with uneven sources of heat, which is designed to produce even heating across its frying surface. The pan body consists of two shells, constructed preferably of heavy aluminum foil, which are separated by a spiral raised rib in the flat bottom surface of the outer shell. Apertures in the center bottom of the outer shell and high in one of the shell walls allow heated air to circulate beneath the entire cooking surface of the inner shell to evenly heat the frying surface. The pan is designed so as to be partially foldable for easy manufacture and disposability. Further, since the pan is constructed of thin material and is quite economical to build, it may be discarded after use.

7 Claims, 4 Drawing Figures

PATENTED MAR 26 1974 3,799,048
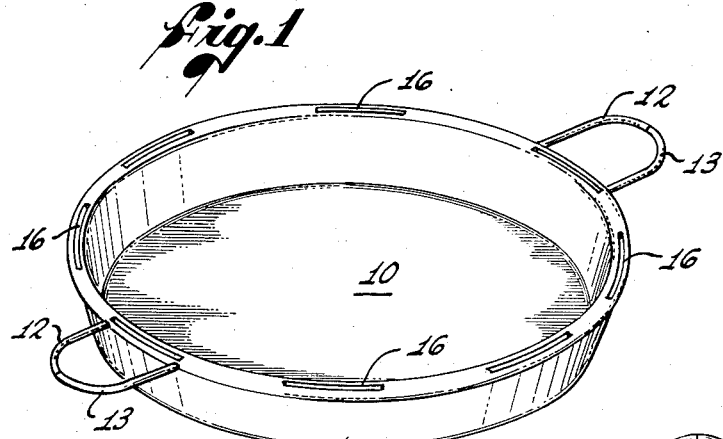
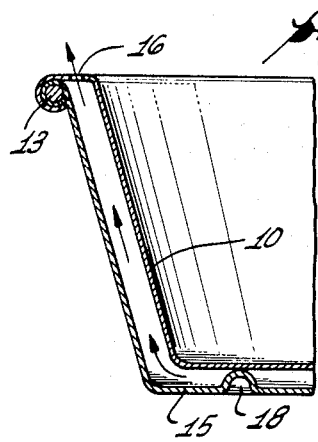
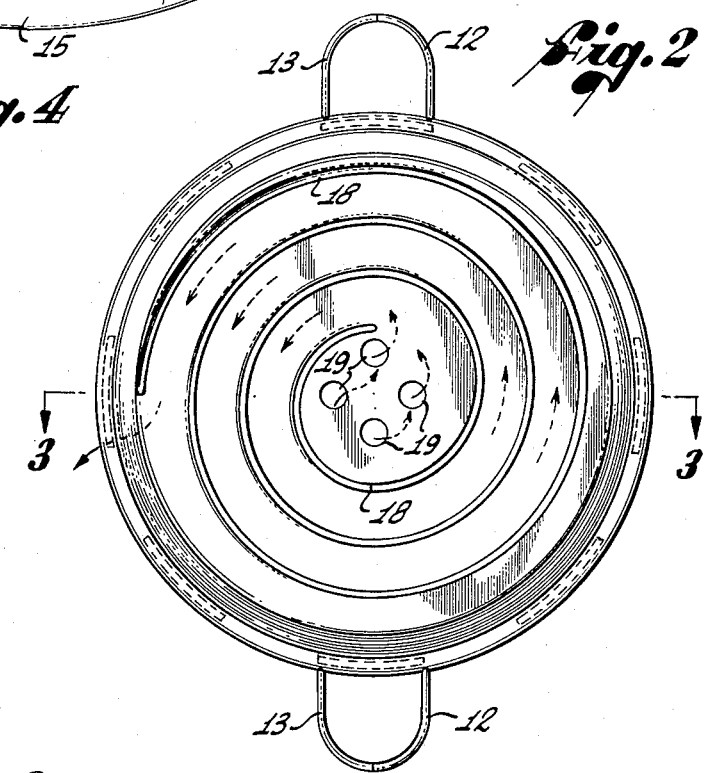
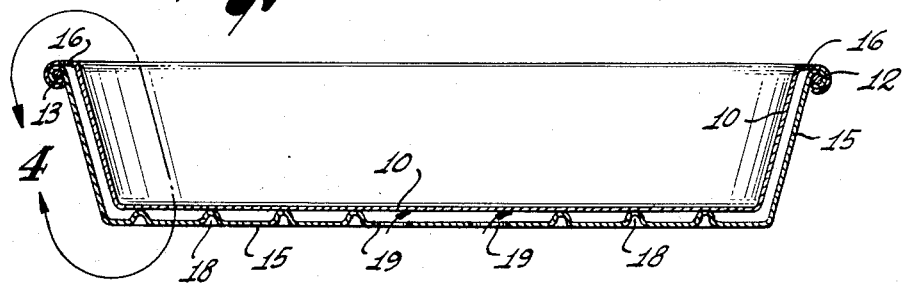

DISPOSABLE COOKING UTENSIL WITH EVEN HEATING

BACKGROUND OF THE INVENTION

This invention relates to cooking utensils and, more particularly, to a disposable frying pan having a design affording even heating across the frying surface.

It is becoming increasingly popular in this country to engage in various outdoor activities which make it necessary to prepare meals out-of-doors. In most cases, many persons use their usual cooking utensils. However, since some cooking utensils are specifically designed with a particular type of heat source in mind, some standard cooking utensils are inadequate for outdoor cooking. Generally, this is because the usual outdoor cooking fire produces hot spots on the cooking surface which results in food being unevenly cooked. The most troublesome example of this is found with the ordinary frying pan, where the usual outdoor cooking fire may scorch food being fried in one area while undercooking the food in an adjacent area.

Further, it is difficult in many instances to properly clean utensils used in outdoor cooking after their use. Quite often, the necessary hot water and cleaning utensils are not available.

SUMMARY OF THE INVENTION

This invention consists of a frying pan designed specifically for use out-of-doors or with an uneven source of heat. The frying pan, consisting of a doulble wall construction, is designed to produce an even heating temperature across the frying surface. Apertures in a center portion of the bottom surface of the outer pan shell allow heated air to enter the space between the two shells of the pan. The air is allowed to exit through slots placed in the uppermost edge of the frying pan. A raised spiral rib in the outermost shell requires air entering the center apertures to circulate in a spiral fashion beneath the entire inner frying surface before exiting through the outlet slots. The circulating air is the primary source of heat for the frying surface. Since the air circulates beneath the entire surface, the resultant heating is substantially even.

Additionally, the frying pan is constructed of an easily bendable material, such as heavy aluminum foil. A two part wire frame is utilized which allows for easy fabrication of the pan.

After the pan has been used for food preparation, the pan may be simply folded about its center line, containing the grease within the fold, and laid aside for future disposal. Since a pan made according to this invention is very economical to construct, it may be discarded after each use and need not be cleaned.

Finally, as may be readily appreciated by anyone who has carried camping equipment, the very light weight of the utensils made according to this invention constitutes a considerably advantage over prior art utensils.

Accordingly, this invention answers the problems raised above. The pan design is such that it achieves even heating across the entire cooking surface. This ensures that there will be no relatively hot and cold spots in the cooking surface when the pan is being used. Further, the pan is economical to make, very light in weight and is readily disposable.

BRIEF DESCRIPTION OF THE DRAWINGS

FIG. 1 illustrates a perspective view of the frying pan according to this invention, showing the air outlet slots and the two part wire handle and frame.

FIG. 2 is a bottom view of the frying pan, illustrating the air inlet holes and the raised spiral rib in the outer pan shell.

FIG. 3 is a cross-section view, taken along the lines 3—3 of FIG. 2, of the pan body illustrating the separation between the pan shells maintained by the raised spiral rib.

FIG. 4 is an enlarged detail of the edge of the frying pan, taken along the lines 4—4 of FIG. 3, showing the manner in which the shells are attached to each other and the wire handle as well as the air outlet slots.

DESCRIPTION OF THE PREFERRED EMBODIMENT

Referring to FIG. 1, the frying pan of this invention is shown. An inner pan member 10 is attached to a circular wire handle and frame consisting of two parts 12, 13 along with a slightly larger but similarly shaped outer member 15. A plurality of slots 16 are spaced around the uppermost edge of the inner pan member 10. As will be explained below, the purpose of the slots 16 is to allow heated air to escape from the space between the two pan members.

From a bottom view (FIG. 2) of the frying pan, the concave side of the spiral raised rib 18 and the air inlet apertures 19 may be seen. Heated air passing between the two members of the frying pan enters apertures 19 and is conducted around the raised rib in the direction of the arrows in FIG. 2.

The dual wall construction of the frying pan may best be seen in FIG. 3. The inner member 10, comprising the frying surface, is generally pan shaped. Its outer edge is crimped at its circumference around circular frame and handle wires 12, 13. The outer member of the pan 15 is slightly larger than the inner member. It is provided with a raised rib in its bottom surface which, as may be seen in FIG. 2, is spiral in shape. Air which enters center apertures 19 of the outer shell passes through the space between the inner and outer shells of the frying pan as defined by the raised rib 18. Since the air passes beneath the entire cooking surface of the inner member, an even heating effect is obtained. It should be understood that though the spiral shape of the raised rib represents the preferred embodiment, the rib may take other shapes. For example radially placed ribs may, in some instances, serve satisfactorily. Further, the exact shape of the raised ribs may be dictated by the type of utensil in which they are used.

The crimping of the two pan halves or members about the circular wire frame and handle may best be seen in FIG. 4. During manufacture, both the inner and outer members of the pan are provided with horizontally extending flanges at their outermost circumferences. The entire flange of the outer member 15 is first crimped about the wire frame and handle 12, 13, as shown in FIG. 4. In addition, a portion of the flange of the inner pan member is also crimped about the wire frame and handle and the previously crimped outer member flange. A portion of the inner member flange is left uncrimped to form a horizontal upper edge of the pan in which the air outlet slots 16 are located.

It may be readily seen, then, that the extremely high temperatures caused in an outdoor fire would create very hot columns of rising air. When the frying pan of this invention is placed on or near the upper portions of the fire, the very hot air enters the center apertures of the outer pan member. The air then passes in a generally spiral path beneath the cooking surface of the inner member. In this way, an even cooking temperature is obtained throughout the cooking surface of the inner pan member. The hot air exits through air outlet slots placed in the uppermost edge of the frying pan.

In addition, the split construction of the wire frame and handle results in an easily disposable pan. After a single use, the pan may be simply folded about its mid line as established by the split handles. The folded pan may contain, if desired, the hot grease left from cooking. The pan may then be easily stored for later disposal.

As may be readily appreciated by those skilled in the art, various changes could be made in the design of the pan shown herein without parting from my invention. For example, I have suggested herein that the double shells of the pan be constructed of heavy aluminum foil. Obviously, any other heat conducting material may be used. In addition, I have shown the air exit slots at the uppermost edge of the frying pan. These may be placed at other locations in the pan, for example, below the crimped wire edge. Finally, while my invention is disclosed in connection with a frying pan, it may be utilized in any cooking utensil to solve problems of uneven heating.

What I claim is:

1. A food cooking utensil for use with uneven sources of heat, comprising a heating member and an outer member, each having a flat bottom surface and an upwardly extending wall around its outer edge, said outer member sized to be slightly larger than said heating member, said two members mounted in a concentric arrangement, first apertures in the center portion of said outer member, means for joining said members at the upper portions of their respective walls, second apertures in one of said walls near said joining means, and, means located between the flat surfaces for separating the flat surfaces of said members and for allowing air to circulate between said members and over the major portion of the flat bottom surface of the heating member, which air enters through said first apertures and exits through said second apertures, thereby uniformly heating said heating member.

2. The combination of claim 1, wherein said separating and air circulating means comprises a spiral shaped raised rib in the flat bottom surface of one of said members.

3. The combination of claim 2, wherein said spiral raised rib is formed in the bottom surface of said outer member.

4. The combination of claim 1, wherein said joining means comprises a circular wire frame to which each of said members are joined.

5. The combination of claim 4, wherein said wire frame consists of a plurality of parts so that said members may be easily collapsed.

6. A frying pan for use with uneven sources of heat, comprising a heating member and an outer member, each member having a flat bottom surface and an upwardly extending wall around its outer edge, said outer member sized to be slightly larger than said heating member, said two members mounted in a concentric arrangement, a spiral raised rib in the flat bottom surface of said outer member to separate said two members, first apertures in the center portion of the flat bottom surface of said outer member, means for joining said members at the upepr portions of their respective walls, consisting of a circular wire frame to which each of said members are attached, and, second apertures in one of said walls near said joining means, whereby air may circulate between the respective surfaces and walls of said members around said spiral shaped means.

7. The combination of claim 6, wherein said wire frame consists of a plurality of parts so that said members may be collapsed.

* * * * *